United States Patent [19]

Di Maria

[11] Patent Number: 5,197,552
[45] Date of Patent: Mar. 30, 1993

[54] COLLAPSIBLE BAR ASSEMBLY FOR AGRICULTURAL EQUIPMENT

[76] Inventor: Philip Di Maria, 18 Catherine Street, Morwell, Victoria, 3840, Australia

[21] Appl. No.: 779,243

[22] Filed: Oct. 18, 1991

[30] Foreign Application Priority Data

Oct. 19, 1990 [AU] Australia .................. PK2911/90
Mar. 6, 1991 [AU] Australia .................. PK4952/91

[51] Int. Cl.⁵ .................................. A01B 61/00
[52] U.S. Cl. .................................. 172/264; 172/439; 172/261
[58] Field of Search ............... 172/261, 264, 265, 266, 172/267, 268, 269, 439; 280/455, 449; 111/151; 171/9

[56] References Cited

U.S. PATENT DOCUMENTS

| | | | |
|---|---|---|---|
| 2,573,221 | 10/1951 | Romig ................. | 172/261 |
| 2,747,486 | 5/1956 | Wilson ................. | 172/261 |
| 3,910,354 | 10/1975 | Johnson et al. ........ | 172/267 |
| 3,972,374 | 8/1976 | Venable et al. ........ | 172/261 |
| 4,312,407 | 1/1982 | Crosby ................. | 172/261 |
| 4,363,363 | 12/1982 | Dyck ................... | 172/264 |
| 4,519,461 | 5/1985 | Harden et al. ......... | 172/266 X |
| 4,609,051 | 9/1986 | Good ................... | 172/266 |

FOREIGN PATENT DOCUMENTS 85958 6/1955 Norway .

*Primary Examiner*—Randolph A. Reese
*Assistant Examiner*—Jeffrey L. Thompson
*Attorney, Agent, or Firm*—Sughrue, Mion, Zinn, Macpeak & Seas

[57] ABSTRACT

A collapsible bar assembly which is particularly useful in couplings between a tractor and an agricultural implement, the collapsible bar assembly having first and second bars which are normally co-linear but which rotate relative to one another when a predetermined compressive force is applied thereto such as by the agricultural implement striking an obstruction. The bar assembly can be incorporated into the draw bar or into various parts of the equipment such as a plough or the like which has ground working tines.

9 Claims, 10 Drawing Sheets

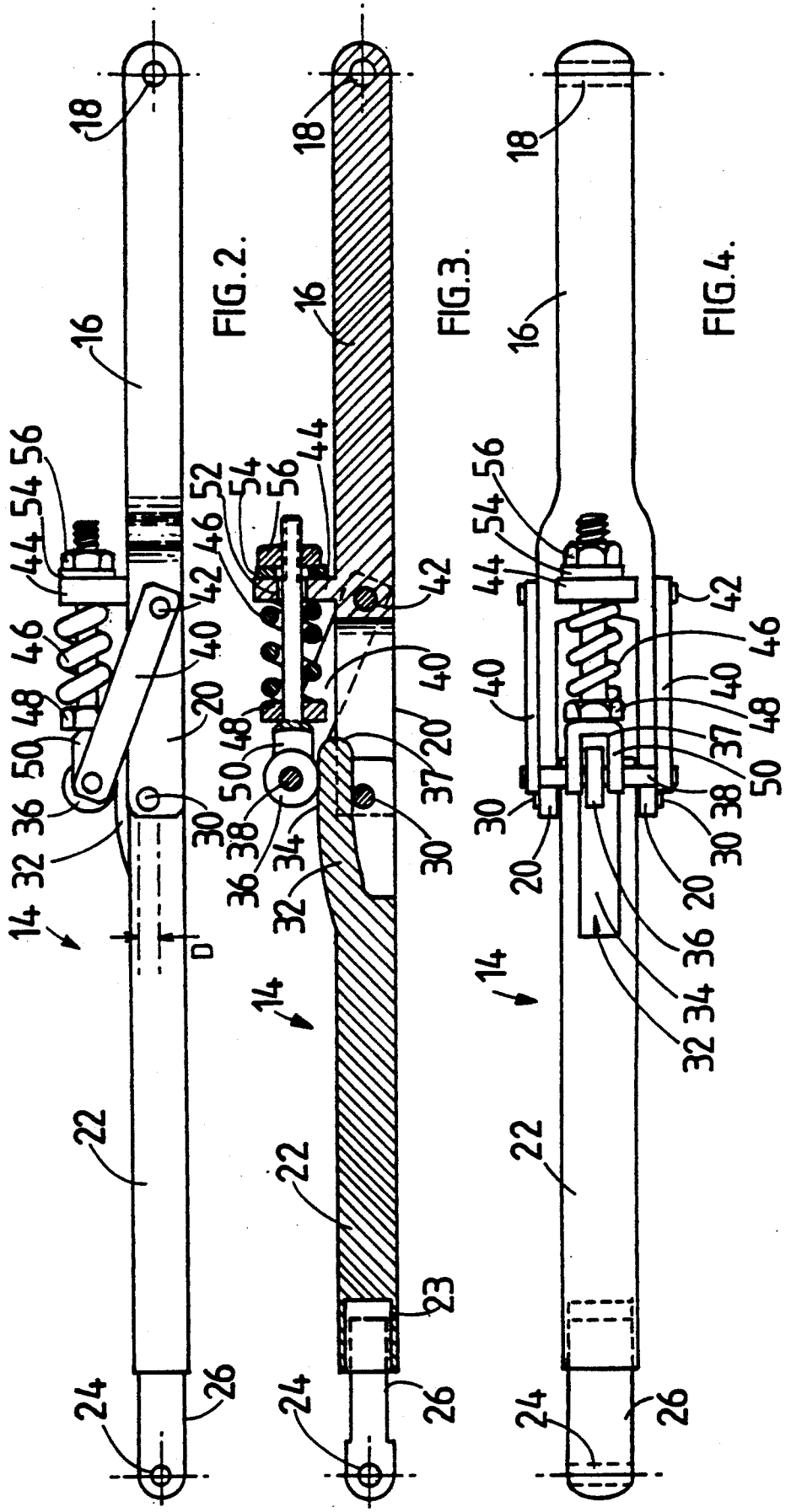

COLLAPSIBLE BAR ASSEMBLY FOR AGRICULTURAL EQUIPMENT

This invention relates to agricultural equipment.

More particularly, the invention relates to a collapsible bar assembly and to agricultural equipment which may incorporate the collapsible bar assembly.

In common forms of couplings for attaching agricultural implements to tractors, it is customary to have a substantial fork member extending from the rear of the tractor. A pivot bar extends between the free ends of the fork member and a pair of arms are pivotally connected to the bar and extend generally upwardly. A further bar is pivotally connected at one end thereof to the free ends of the bars and at the other end thereof to the tractor. In this type of arrangement, the further bar is normally subjected to and must withstand compressive forces. However, in use of the mounting say for instance in supporting a ripper, very large compressive forces are applied to the further bar when the ripper strikes an obstacle. It is not uncommon for the mounting to be damaged when an implement carried thereby strikes an obstacle.

It is an object of the invention to provide a collapsible bar assembly which can be used in the mounting described above in place of the further bar. The collapsible bar assembly could be used in any arrangement where the effective length of a bar is required to change when the compressive forces applied to the bar exceed a predetermined value.

According to the present invention there is provided a collapsible bar assembly having connecting means at either end thereof for application to the bar of longitudinal compressive forces, said assembly comprising first and second bars having one of said connecting means at either end thereof, the other ends of the first and second bars being pivotally connected together about a first axis which is transverse to the bars and offset transversely relative to the longitudinal direction thereof, the first and second bars having abutting surfaces for preventing rotation of the bars about said first axis in a first sense in which said axis moves towards the longitudinal direction of the bars, the first bar having a restraining member for preventing pivoting of the bars about said first axis in a second sense opposite to said first sense, said restraining means being releasable when the longitudinal compressive forces applied to the assembly through said connecting means exceeds a predetermined value. Upon release of the restraining means, the two bars can pivot about said first axis thereby reducing the spacing of the connecting means.

It is preferred that the restraining means comprises a roller which is resiliently biased into contact with a tongue member affixed to the second bar. It is further preferred that the roller is carried by a link which is pivotally connected to the first bar near the other end thereof, the link being rotatable on release of the restraining means.

The invention also provides a collapsible bar assembly comprising a first bar, a second bar pivotally connected to the first bar by first pivot means, second and third pivot means for establishing pivotal connections of the ends of the bar assembly to other bodies, the pivot axis of the first pivot means being laterally offset relative to a line passing through the pivot axes of the second and third pivot means and restraining means for holding the assembly in an expanded condition until compressive forces are applied via the second and third pivot means exceed a predetermined value whereupon the restraining means yields to permit pivotal movement of the first and second bars about the first pivot axis.

The invention also provides a novel agricultural implement which may incorporate the collapsible bar assembly defined above.

Accordingly the invention provides agricultural equipment comprising first and second members pivotally coupled together, mounting means for mounting the first and second members to a tractor or linkage of a tractor, means for coupling ground working tools to the second member, a yieldable bar acting as a stay between the first and second members and being yieldable to permit rotation of the first and second members when, in use, the working tools strike an obstruction.

The invention also provides an agricultural implement comprising a framework including tubular laterally extending beams, ground working tools mounted on beams which are telescopically received in the laterally extending beams and fixing means for fixing the positions of the ground working tools at selected locations. In this way the effective width of the implement can be varied.

The invention also provides a combined ground working implement and lifting device, said apparatus comprising a framework which includes mounting means for removably mounting ground working tools, lifting members mountable in the mounting means to act as at least part of the jaws of a lifting device.

In one arrangement, the apparatus may include ripper tines which can be removed from their operative positions and reversed so as to form part of the jaws of a lifting device.

In an alternative arrangement, the agricultural implement may include a number of yieldable bars each associated with one or more ground working tools. The yieldable bars can be located between a framework for the apparatus and the groups of ground working tools.

The invention will now be further described with reference to the accompanying drawings, in which:

FIG. 2 is a side view of a preferred form of the invention;

FIG. 3 is a central longitudinal cross-section through the assembly;

FIG. 4 is a plan view of the bar assembly;

Figure 1:
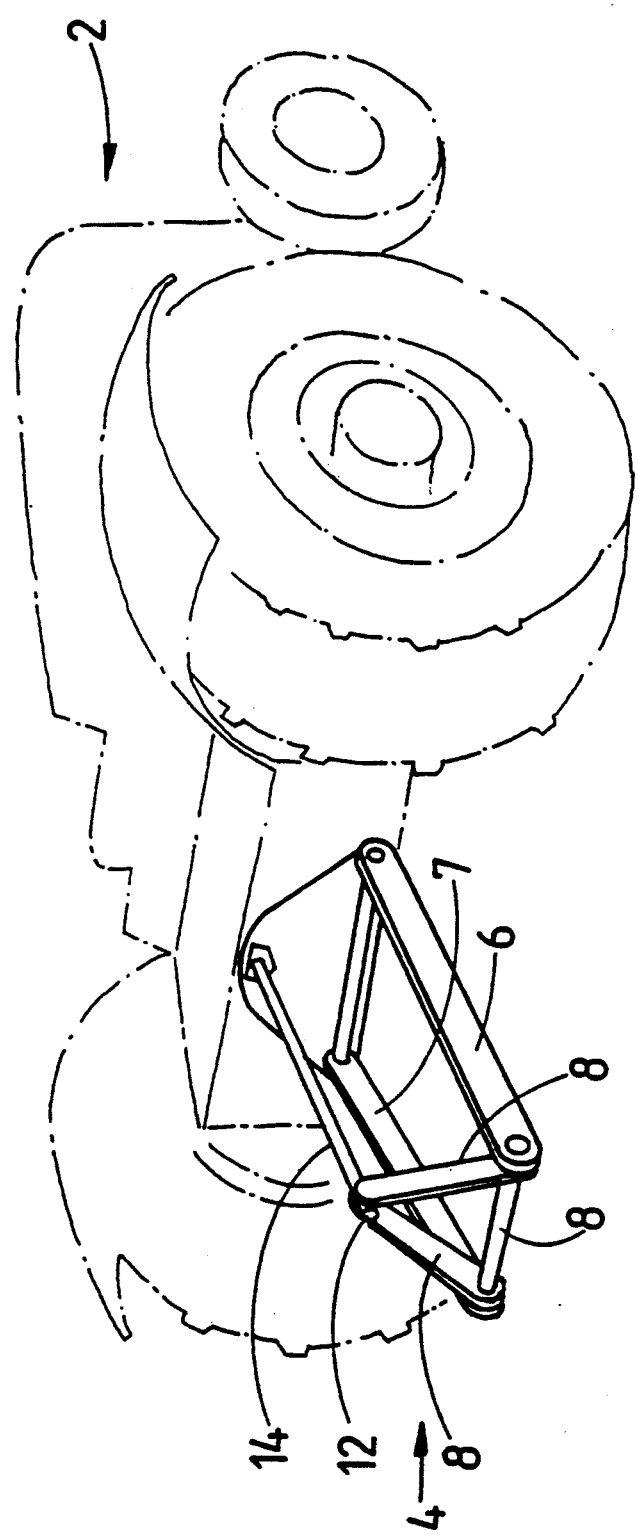
FIG. 1 is a perspective view of the rear of a tractor showing a mounting which includes the collapsible bar assembly of the invention.

In FIG. 1 there is shown a tractor having a mounting 4 for an implement (not shown in FIG. 1). The mounting includes linkage arms 6 and 7 which extend from the rear of the tractor and have connected between their free ends a pivot bar 8. Pivotally mounted on the bar 8 is a pair of arms 10 which extend upwardly and are interconnected by a pin 12. A bar 14 extends from the interconnection of the arms 8 to the rear of the tractor. The bar 14 is normally subjected to compressive loads during use of the mounting and is subjected to excessive compressive loads when implements carried by the mounting strike obstacles. In accordance with the present invention, the bar 14 is collapsible when the compressive forces applied thereto exceed a predetermined value so as to reduce the possibility of damage to the mounting and/or implement when the implement strikes an obstacle.

FIGS. 2 to 4 illustrate a preferred form of collapsible bar assembly in accordance with the invention. The assembly comprises a first bar portion 16 having connecting means 18 at one end thereof. The connecting means may simply comprise a circular bore for forming a pivotal connection at the tractor (or pin 12 of the mounting). Alternatively, the connecting means may comprise a ball or socket for forming a ball and socket connection. The other end of the bar 16 is formed in the shape of a yoke having two arms 20. The bar assembly 14 further comprises a second bar 22 having connecting means 24 at one end thereof. The connecting means 24 can be of the same type as the connecting means 18. As best seen in FIG. 3, the second bar is adjustable in length by providing the connecting means 24 on a short threaded member 26 which is threadably received in a recess 28 formed in the bar 22. The other end of the bar 22 is pivotally connected between the arms 20 of the yoke of the first bar 16 by a pin 30. As shown in FIG. 2, the axis of the pin 30 is offset by a distance D from a line joining the centres of the connecting means 18 and 24 so that when compressive forces are applied to the assembly through the connecting means 18 and 24, the bars 16 and 22 will tend to rotate relative to one another such that the pin 30 moves upwardly (as seen in FIG. 2).

The second bar 22 includes a tongue member 32 which extends generally above the bar 22 and projects somewhat from the end thereof. The tongue 32 has a slightly curved upper surface 34 and a rounded nose portion 37. The underside of the tongue 32 bears against the pin 30 to prevent rotation of the bars such that the pin 30 would move downwardly as seen in FIG. 3.

A roller 36 connected to the first bar 16 is provided to bear against the surface 34 of the tongue 32 to prevent deflection of the bars 16 and 22. The arrangement is however such that when the compressive forces applied to the bars through the connecting means 18 and 24 exceed a predetermined value, the roller 36 yields and permits the tongue 32 to move past the roller thereby allowing a large degree of rotation of the bars 16 and 22 about the pin 30. In this way, the spacing between the connecting means 18 and 24 is greatly reduced.

The roller 36 is mounted upon a pin 18 which is pivotally connected to a pair of links 40 which are, in turn, pivotally connected by a pin 42 to the arms 20 of the first bar 16. The pin 38 is biased in an anticlockwise direction (as seen in FIG. 3) by a compression spring 44 so that the roller 36 bears against the curved surface 34 of the tongue 32. The compression spring 44 acts between a boss 46 projecting upwardly from the first bar 16 and a nut 48 mounted on the shaft of a yoke member 50. The forked part of the yoke member 50 maintains the roller in position on the pin 38. The other end of the shaft of the yoke 50 passes through a clearance hole 52 in the boss 44 and terminates in a threaded portion upon which is placed a washer 54 and retaining nut 56. Adjustment of the nut 48 alters the amount of compression of the spring 46 and therefore alters the downward component of force applied by the roller 36 on the tongue 32. In this way, it is possible to adjust the assembly to deflect upon application of various compressive forces through the connecting means 18 and 24.

Once a sufficiently large compressive force has been applied to the assembly, the bars 16 and 22 will begin to deflect and the roller 36 will roll upon the surface 34 of the tongue until the roller 36 engages the rounded nose portion 37 of the tongue. At this point, the tongue will clear the roller 36 and permit considerable rotation of the bars 16 and 22 about the pin 30 thereby substantially reducing the distance between the connecting means 18 and 24. This is shown diagrammatically in FIG. 7.

Figure 5:
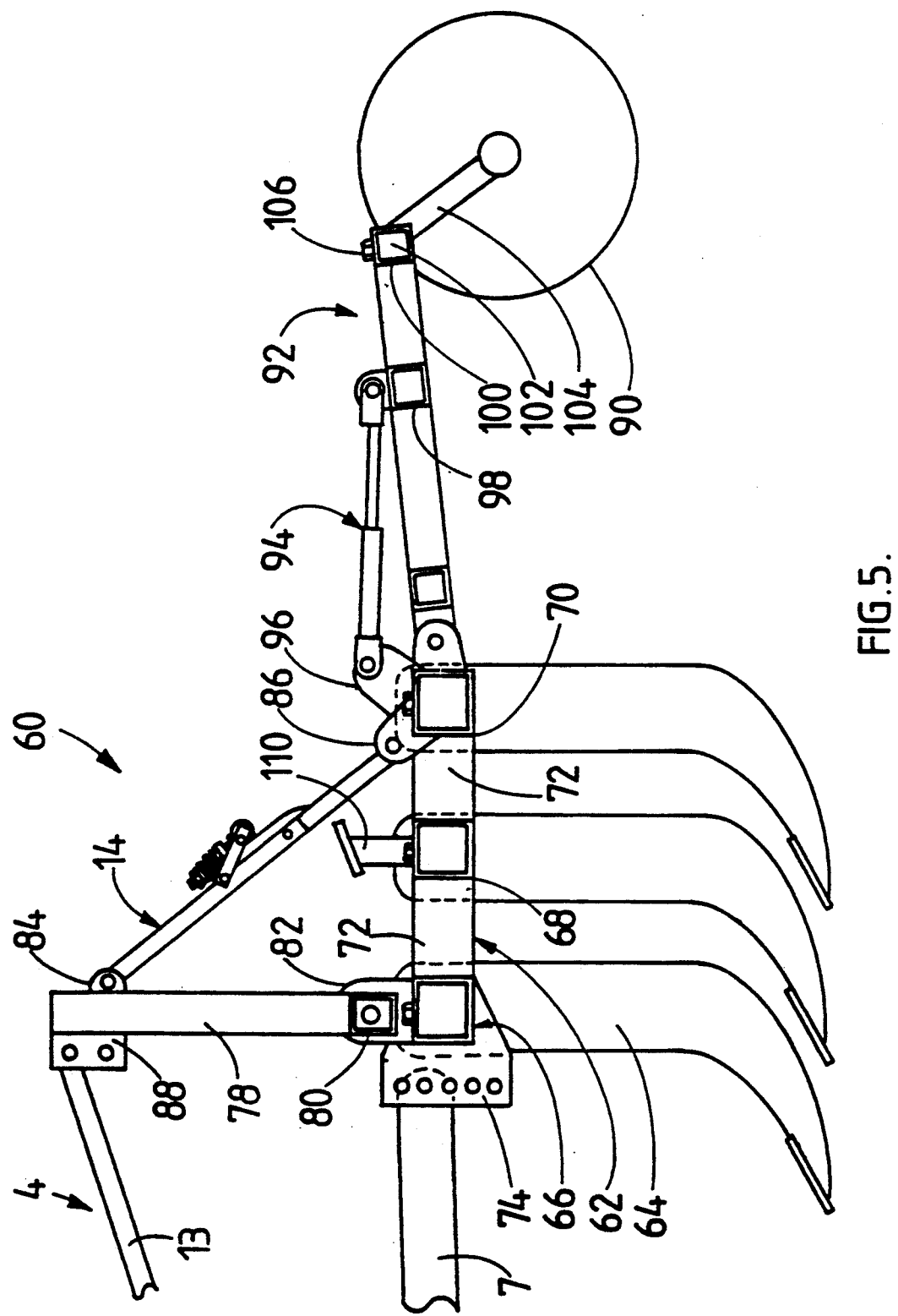
FIG. 5 is a side view of an agricultural implement incorporating the bar assembly.
Figure 10:
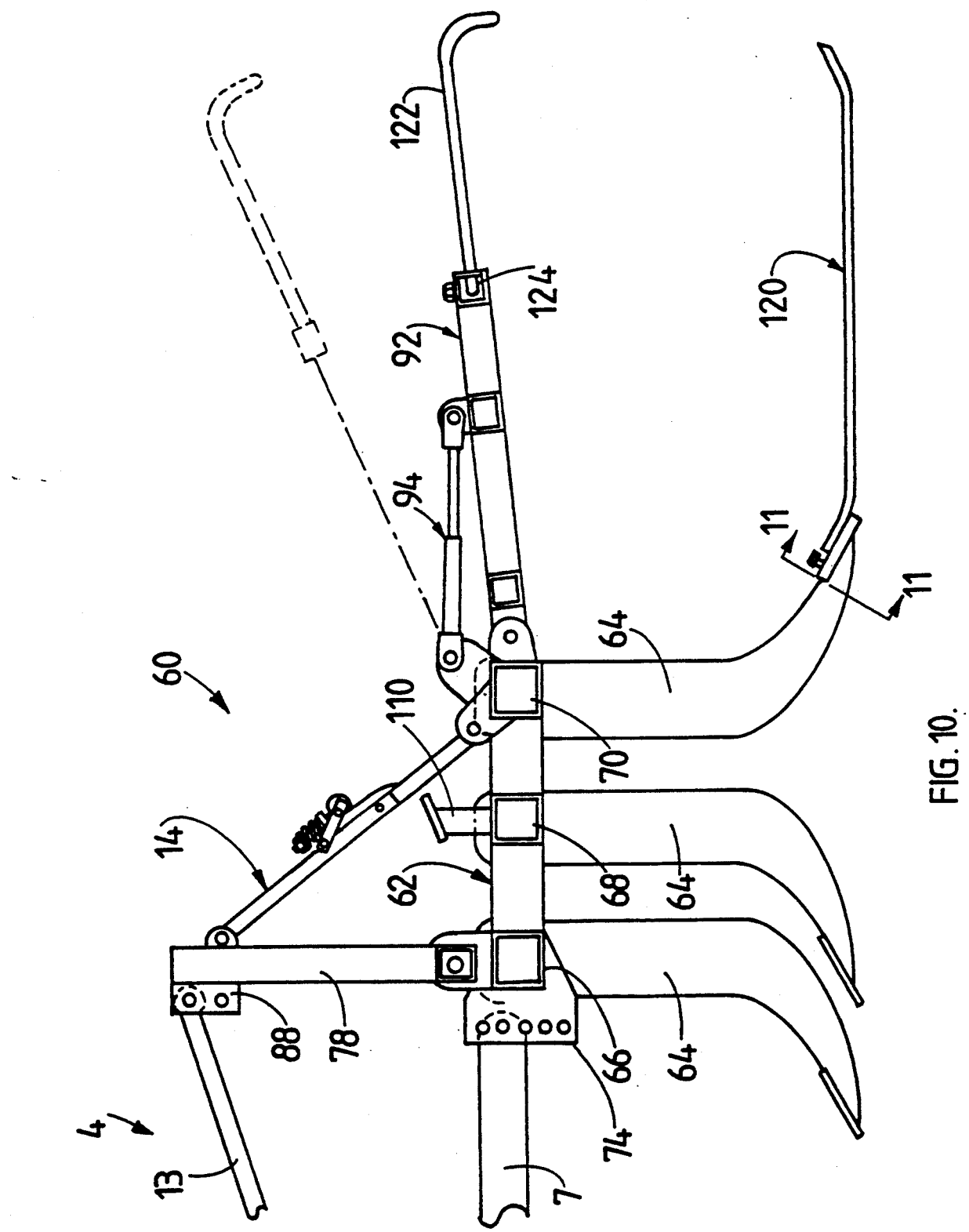
FIG. 10 is a side view of a combined ground working and lifting device in accordance with the invention.

In the arrangement illustrated in FIGS. 1 to 4, the collapsible bar assembly is provided in the mounting 4 for mounting an implement on a tractor. It is possible of course to provide the collapsible bar in the implement itself and such an arrangement is illustrated in FIGS. 5 and 10. In these arrangements the mounting 4 at the tractor uses a bar 13 of fixed length instead of the collapsible bar assembly.

Figure 6:
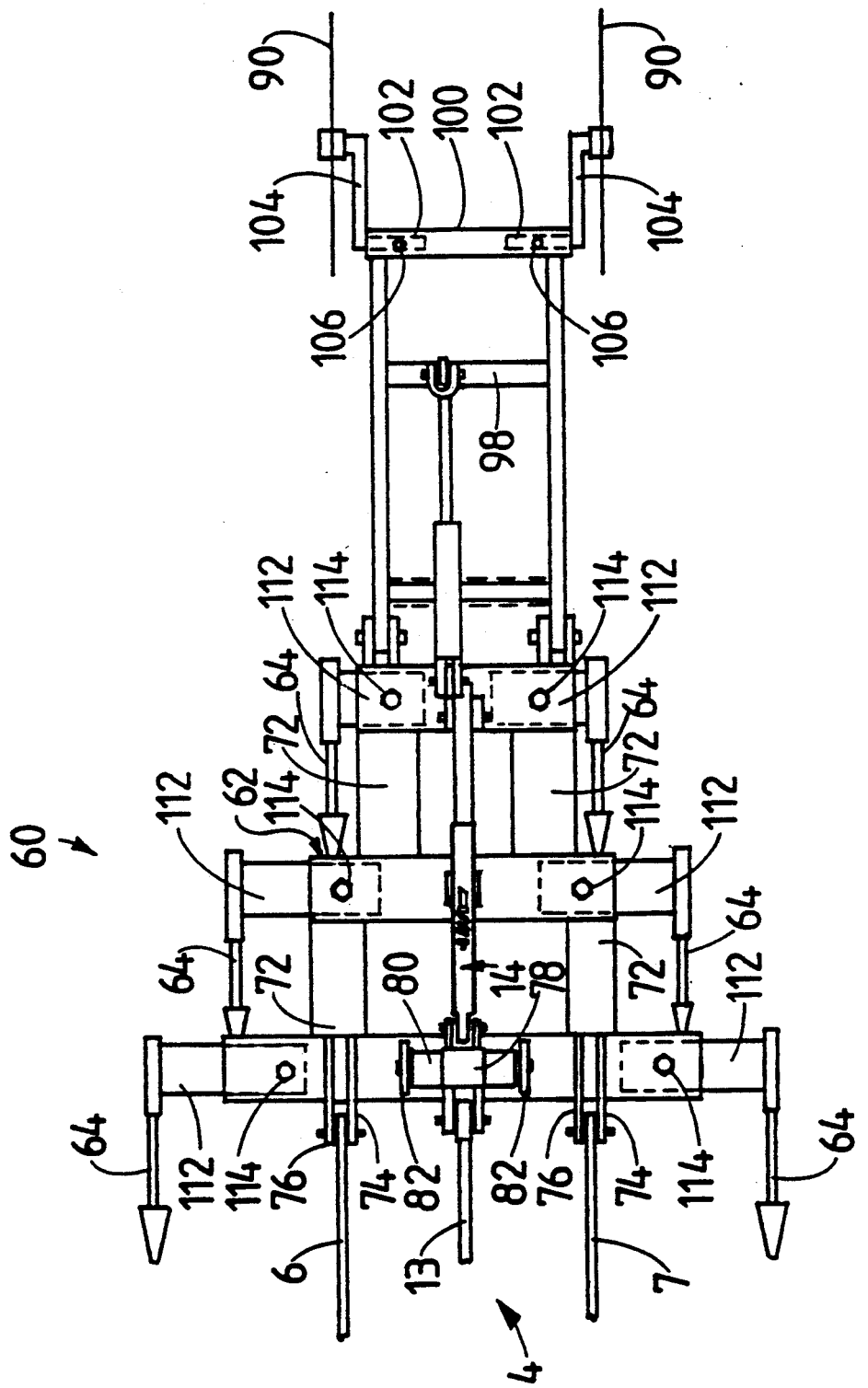
FIG. 6 is a plan view of the implement.
Figure 7:
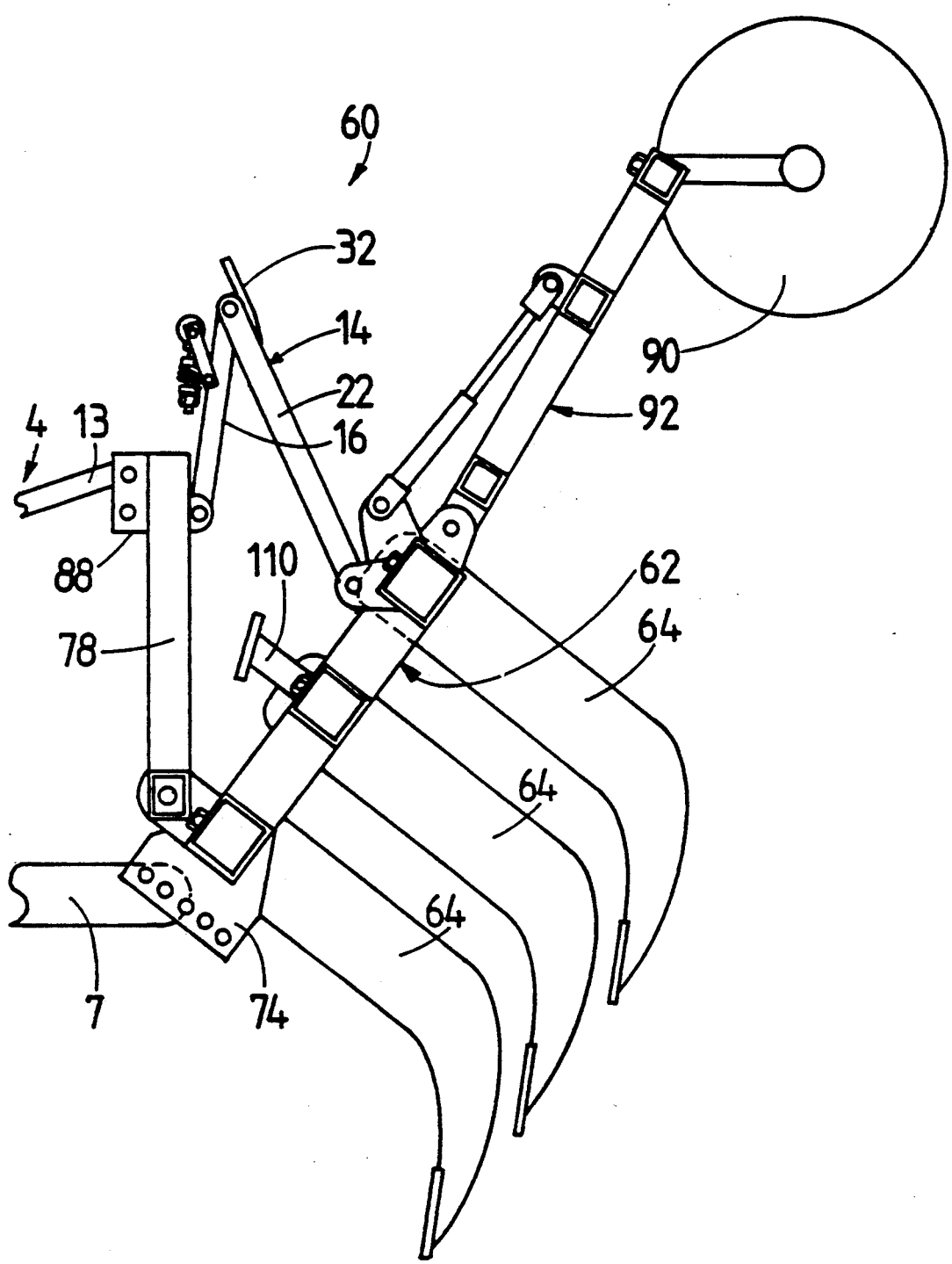
FIG. 7 shows the implement after release of the collapsible bar assembly.

The implement illustrated in FIGS. 5 to 7 is a ripper 60 for working soil. The ripper 60 includes a framework 62 upon which are mounted tines 64. The framework 62 includes three tubular cross beams 66, 68 and 70 interconnected by pairs of connecting beams 72. The forward cross beam 66 includes mounting plates 74 and 76 for forming pivotal connections with the arms 6 and 7 of the mounting 4 of the tractor. The framework includes a post 78 the lower end of which is connected to a short cross beam 80 which is pivotally connected between a pair of brackets 84 projecting upwardly from the forward beam 66. The post 78 is normally held in position by the collapsible bar assembly 14 which extends from a pair of brackets 84 located near the top of the post 78 and a further pair of brackets 86 projecting from the rearward beam 70. The post 78 also includes a mounting plate 88 for forming a pivotal connection with the fixed length bar 13 of the mounting 4.

The implement 60 includes a pair of trailing wheels or shears 90 which can be used to alter the depth of penetration of the tines 64. The wheels 90 are mounted on a movable framework 92 which is actuated by means of a ram 94. One end of the ram 94 is pivotally connected between a pair of plates 96 which project from the rearward transverse beam 70. The other end of the ram is connected to a cross bar 98 which forms part of movable framework 92. The free end of the framework 92 is defined by a tubular cross bar 100, the ends of the bar 100 being open so as to receive mounting shafts 102 of legs 104 upon which the wheels 90 are mounted. Bolts 106 are provided to retain the shafts 102 in position. In use of the implement the wheels or shears 90 travel along the ground and therefore the effective depth of penetration of the tines 64 can be adjusted by operating the ram 94.

In use of the implement, if the tines 64 strike an obstacle, the collapsible bar assembly 14 will yield and permit rotation of the framework 62 to the position shown in FIG. 7. This will substantially reduce the possibility of damage to the implement 60, mounting 4 or the tractor 2. It will be noted from FIGS. 5 and 7 that when the bar 14 does yield, the framework 62 will pivot relative to the arms 6 and 7 and consequential rotation of the framework will occur relative to the post 78, the latter remaining generally upright. The framework may include an abutment 110 projecting upwardly from the bar 68 to limit upward rotation of the framework 62. The abutment will come into contact with the post 78 and limit rotation.

The tines 64 are mounted upon square shafts 112 which are telescopically received in the ends of the cross beams 66, 68 and 70. Thus the lateral positions of the tines 64 can be adjusted. This permits flexibility in usage of the implement and relatively compact size for transport and storage. It also enables a simple and convenient technique for altering the types of tines to be used and/or replacement thereof. The framework includes tightening bolts 114 to selectively fix the positions of the shaft 112 in the cross beams.

Figures 8, 9:
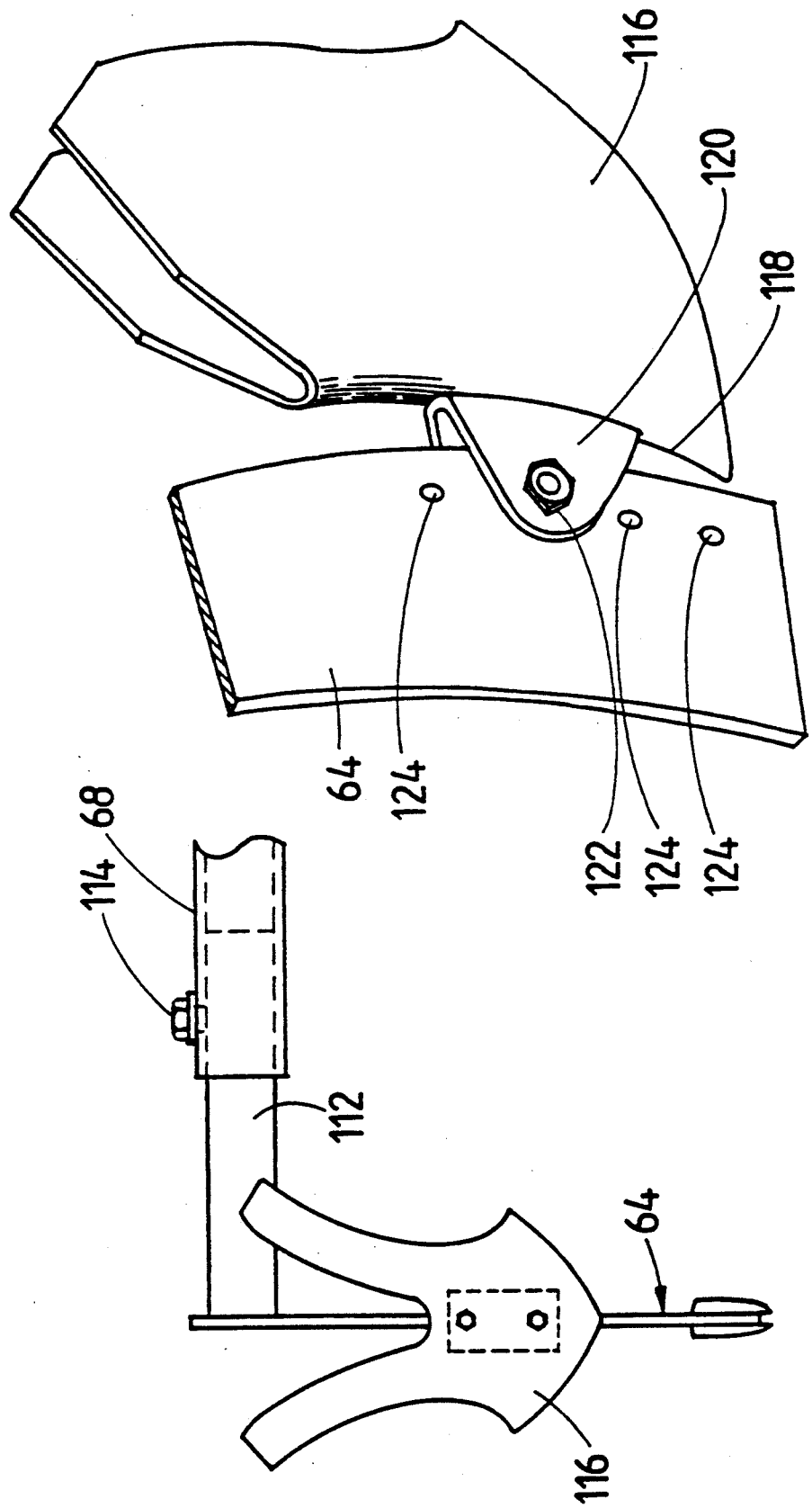
FIG. 8 is a schematic view of part of a modified implement.
FIG. 9 is a side view of the modified apparatus of FIG. 8.

The tines 64 may have connected thereto flaring members 116 which operate to spread the earth laterally. In this way the implement can operate like a plough. As best seen in FIG. 9, the forward edge 118 of the flaring member includes a mounting yoke 120 which includes a tightening bolt 122 the inner end of which is selectively received in blind holes 124 provided adjacent to the trailing edge of the tines 64.

The bar assembly 14 could be also used in other forms of agricultural equipment or earth working, haulage or similar equipment in which structural components are sometimes subjected to excessive compressive forces.

Figure 11:
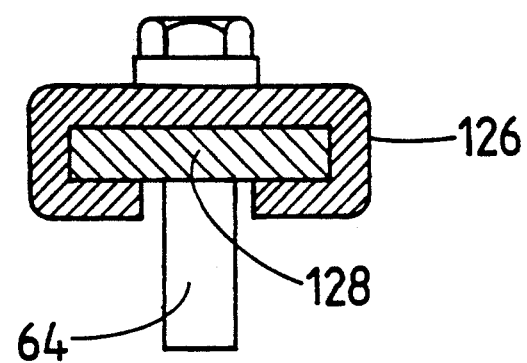
FIG. 11 is a fragmentary sectional view along the line 11—11.

FIGS. 10 and 11 illustrate a modification of the implement 60 such that it can be used as a lifting device for lifting various objects such as large hay rolls or the like. In this modified form of use of the implement the tines 64 mounted in the rearward beam 70 have been removed and laterally interchanged so that they are reversed in orientation. Lifting bars 120 can be connected to extend rearwardly from the ends of the reversed tines. In addition, the wheels 90 are removed and upper lifting bars 122 are coupled to the free end of the movable framework 92. More particularly, the lifting bars 122 have mounting shafts 124 which extend in the ends of the hollow cross beam 100 and are fixed in position by tightening the bolts 106. The lower lifting bars 120 preferably include mounting brackets 126 which are shaped to be mounted on cutting teeth 128 of the tines 64. The brackets 126 are C-shaped in cross section and a tightening bolt 130 is provided to bear against the teeth 128 and therefore fix the lower lifting bars 120. The ram 94 can be used to raise and lower the upper lifting bars 122 for grabbing various objects such as rolls of hay. The position of the lower bars 120 can be varied by moving the position of the bar 13 of the mounting 4.

Figure 12:
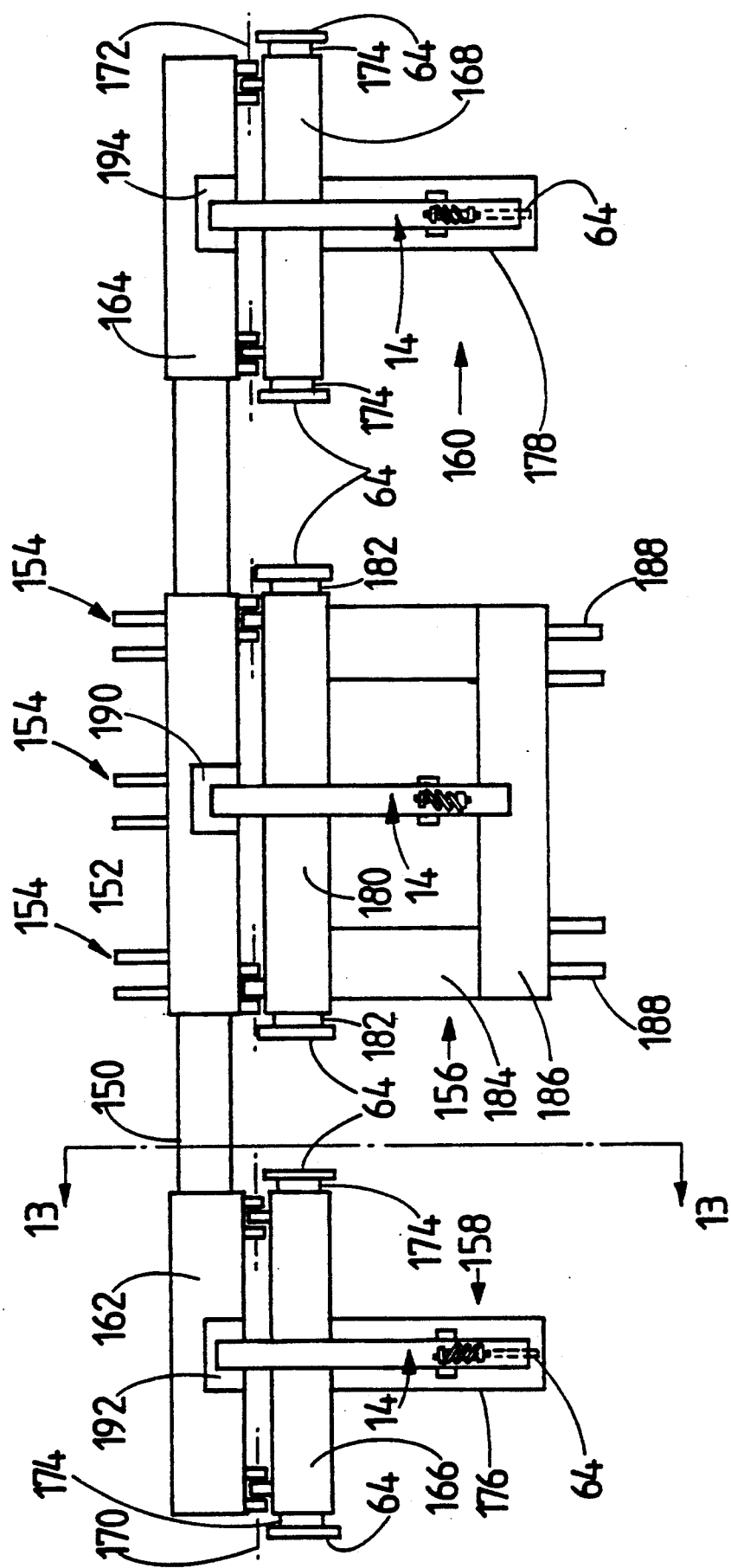
FIG. 12 is a plan view of a modified form of the invention.
Figure 13:
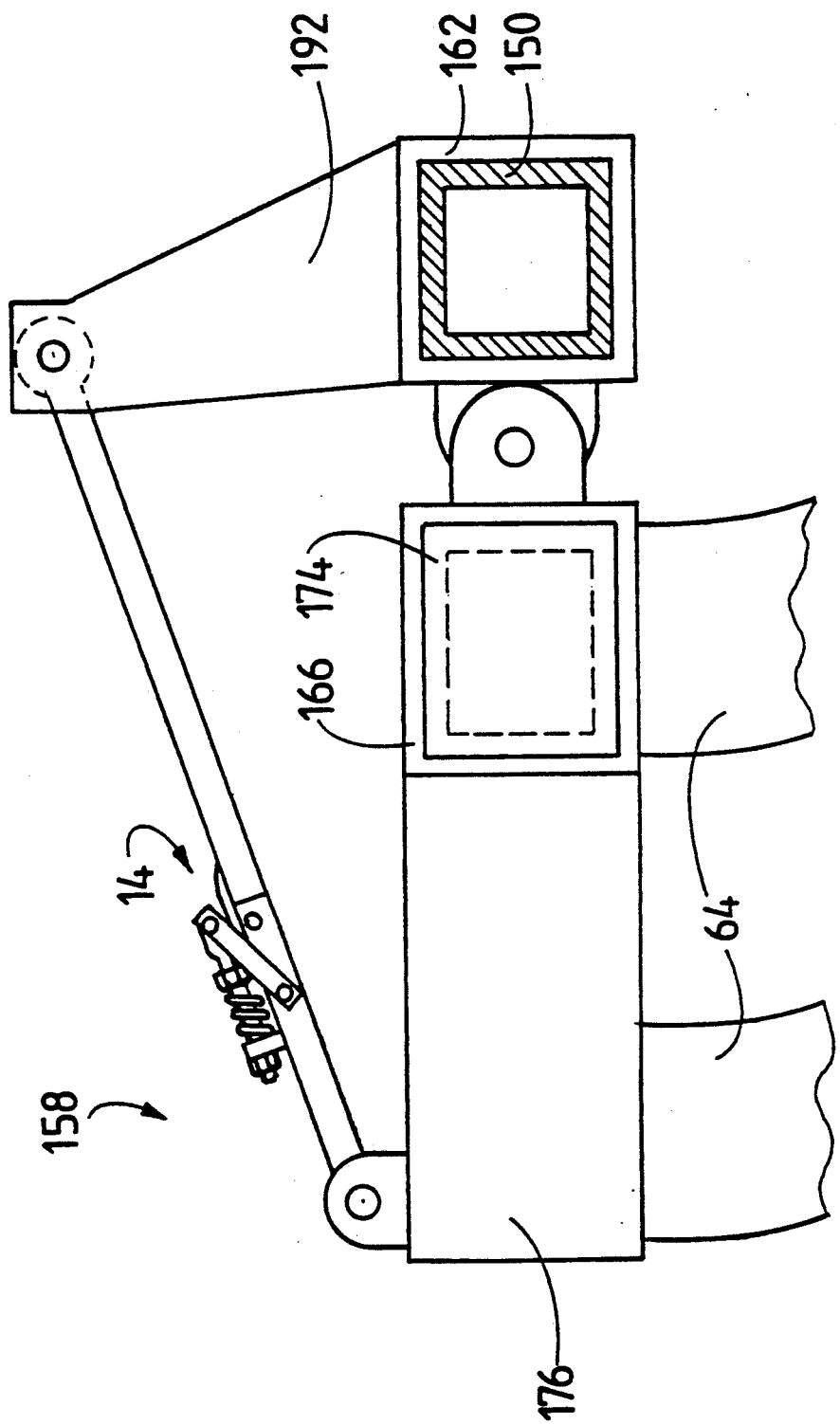
FIG. 13 is a schematic view along the line 13—13.

FIGS. 12 and 13 illustrate a modified form of the invention and the same reference numerals are used to denote corresponding parts where appropriate. In this arrangement a plurality of collapsible bar assemblies 14 are used each in conjunction with a group of tines 64. The apparatus includes a main cross beam 150 having a central portion 152 which has mounting brackets 154 for coupling to a three point linkage. The apparatus includes central, left hand and right hand groups of tines 156, 158 and 160. The central group 156 is fixed laterally with respect to the beam 152 whereas the groups 158 and 160 are laterally adjustable with respect to the beam 150. This is accomplished by tubular mounting beams 162 and 164 which are slidably mounted over the transverse beam 150. Bolts (not shown) are used to fix the beams 162 and 164 relative to the beam 150. Hollow beams 166 and 168 are pivotally connected to the beams 162 and 164 respectively for rotation about axes 170 and 172. The tines 64 are mounted on the ends of shafts 174 which are telescopically received within the open ends of the beams 166 and 168. Projecting rearwardly from the beams 166 and 168 are support beams 176 and 178 from which extend tines 64.

The central group of tines 56 includes a beam 180 which is pivotally connected to the central portion 152, the tines being mounted on the ends of beams 182 which are telescopically received in the ends of the beam 180. The arrangement includes a pair of support beams 184 which supports a short transverse beam 186 having brackets 188 coupled thereto. The brackets 188 can be used to mount a movable framework (not shown in FIG. 12) which has the same function as the framework 92 illustrated in FIGS. 10 and 11.

Each of the groups of tines 156, 158 and 160 has associated therewith one of the collapsible bars 14 of the invention. More particularly, the central group 156 has one end of the bar 14 pivotally connected to the beam 186 and the other end to a post 190 which projects upwardly from the beam 152. The group 158 has one end of the bar 14 pivotally connected near the free end of the beam 176 and the other end of the bar 14 pivotally connected to a post 192 which projects upwardly from the beam 162. Similarly at the other side of the device, the bar 14 is pivotally connected between the beam 178 and a post 194 which projects upwardly from the beam 164.

The arrangement illustrated in FIGS. 12 and 13 has the advantage that should one of the tines strike an obstacle, the collapsible bar 14 associated therewith will release but the remaining groups of tines will still remain operable. Further, the forces to be borne with each of the collapsible bars 14 is less than the case where a single collapsible bar is used in association with all of the tines as in the case of FIGS. 10 and 11. Thus in the distributed arrangement shown in FIGS. 12 and 13, the bars 14 can be made much less robust than those which would be required for an arrangement like that illustrated in FIG. 10.

Many modifications will be apparent to those skilled in the art without departing from the spirit and scope of the invention.

I claim:

1. A collapsible bar assembly having connecting means at either end thereof for application to the bar assembly of longitudinal compressive forces, said assembly comprising first and second bars having one of said connecting means at either end thereof, the other ends of the first and second bars being pivotally connected together about a first axis which is transverse to the bars and offset transversely relative to the central longitudinal axis thereof, the first and second bars having abutting surfaces for preventing rotation of the bars about said first axis in a first direction in which said first axis moves towards said central longitudinal axis, the first bar having a restraining member for preventing pivoting of the bars about said first axis in a second direction opposite to said first direction, said restraining means comprising a roller which is resiliently biased into contact with a tongue member affixed to the second bar, said restraining means being releasable when the longitudinal compressive forces applied to the assembly through said connecting means exceed a predetermined value.

2. An assembly as claimed in claim 1 wherein the roller is carried by a link which is pivotally connected to the first bar near the other end thereof, the link being rotatable on release of the restraining means.

3. An assembly as claimed in claim 2 wherein the link is one of a pair of links which support a shaft on which the roller is mounted and wherein one end of a yoke is coupled to the shaft and the other end of the yoke is slidably coupled to said first bar.

4. An assembly as claimed in claim 3 including a compression spring which acts between the yoke and the first bar.

5. Apparatus for mounting an implement to a tractor said mounting comprising a number of bars at least one of which comprises a collapsible bar assembly as claimed in claim 1.

6. A collapsible bar assembly comprising a first bar, a second bar pivotally connected to the first bar by first pivot means, second and third pivot means for establishing pivotal connections of the ends of the bar assembly to other bodies, the pivot axis of the first pivot means being laterally offset relative to a line passing through the pivot axes of the second and third pivot means and restraining means for holding the assembly in an expanded condition until compressive forces applied via the second and third pivot means exceed a predetermined value whereupon the restraining means yields to permit pivotal movement of the first and second bars about the first pivot axis, and wherein said restraining means comprises a roller which is resiliently biased into contact with a tongue member affixed to the second bar.

7. An agricultural implement incorporating a collapsible bar assembly as claimed in claim 6.

8. Agricultural equipment comprising first and second members pivotally coupled together, mounting means for mounting the first and second members to a tractor or linkage of a tractor, means for coupling ground working tools to the second member, a collapsible bar assembly as claimed in claim 6, acting as a stay between the first and second members and being yieldable to permit rotation of the first and second members when, in use, the working tools strike an obstruction.

9. An agricultural implement comprising a framework including tubular laterally extending beams, ground working tools mounted on beams which are telescopically received in the laterally extending beams and fixing means for fixing the positions of the ground working tools at selected locations, and wherein the framework includes first and second portions which are pivotally connected together and wherein a collapsible bar assembly as defined in claim 6 is mounted between said first and second portions so as to prevent relative rotation until the ground working tools strike an obstruction.

* * * * *